United States Patent [19]

Spence-Bate

[11] 4,068,945
[45] Jan. 17, 1978

[54] MICROFORM EDITORS

[76] Inventor: Harry Arthur Hele Spence-Bate, 1 Cheam Place, Morley, Australia, 6062

[21] Appl. No.: 720,503

[22] Filed: Sept. 3, 1976

[30] Foreign Application Priority Data

Sept. 8, 1975 Australia .............................. 3069/75

[51] Int. Cl.² ...................... G03B 27/42; G03B 27/64; G03B 27/44

[52] U.S. Cl. ........................................ 355/54; 355/53; 355/64

[58] Field of Search ....................... 355/40, 53, 54, 64, 355/95, 96, 77, 132, 89, 90

[56] References Cited

U.S. PATENT DOCUMENTS

| 2,296,655 | 9/1942 | Stuart | 355/54 X |
| 3,511,565 | 5/1970 | Harman et al. | 355/64 X |
| 3,601,487 | 8/1971 | Burton et al. | 355/53 |
| 3,741,645 | 6/1973 | Hollwedel et al. | 355/64 X |
| 3,853,399 | 12/1974 | Walsh | 355/64 |

Primary Examiner—Donald A. Griffin
Attorney, Agent, or Firm—Fidelman, Wolffe & Waldron

[57] ABSTRACT

Copying apparatus for copying a selected frame from one of a plurality of rolls of microfilm, contained in the apparatus, onto a selected position on a microfiche; the rolls of microfilm are carried on an X and Y axis moveable carriage which is moveable in relation to a camera lens, and the microfiche is also moveable in the X and Y axis relative to the lens; detectors may be provided on the carriage for detecting the position of the selected frame of microfilm and electrical means are provided to hold the selected film in the lens axis for transfer to the microfiche; suitable programming can select a sequence of microfilm images to be recorded in a set sequence on the microfiche.

5 Claims, 4 Drawing Figures

MICROFORM EDITORS

The present invention relates to improvements in microfiche and microfilm editors and information stores.

In my previous patent application Ser. No. 497,463 there is disclosed a manually operated arrangement for aligning a frame of a single roll of microfilm of a microfiche camera lens. The lens is used to transpose the image on the microfilm on to a microfiche carriage of an X and Y axis moveable carriage for the purpose of producing a microfilm to microfiche transposition, such an arrangement is slow to operate and inflexible in use since images of only one microfilm can be transferred on to only one microfiche during one editing operation. Furthermore due to the manual operation no pre-programming of the transfer operation can be conducted.

In my further patent application Ser. No. 599,586 further improvements in editing arrangements are disclosed and discussed. These improvements consist in part in providing roll type microfiche cassettes and transferring images from a microfiche roll film on to a single microfiche. While pre-programming of the operation can be conducted nevertheless the apparatus is still to an extent inflexible in that only images from one roll of microfiche can be transferred in any one editing operation and changing the roll involves a considerable delay in operation and makes the pre-pregramming of the transfer of images from more than a single roll impracticable.

Accordingly, there is provided according to the invention, a microform copying apparatus comprising means for holding a plurality of rolls of microfilm on a carriage moveable in an X and Y direction in relation to a camera lens, means for holding a microfiche film approximate to camera lens means for holding a microfiche film approximate to camera lens such that images can be transferred from a selected said roll of film on to a microfiche held on the means for holding the microfiche, said microfiche holding means being further enabled to move in an X and Y direction in relation to the camera lens.

Such an apparatus provides a large degree of flexibility in operation since the images on rolls of film from different sources can be combined with ease onto one microfiche.

In a preferred example of the apparatus according to the invention each roll of film is detachably mounted on a drive arrangement which by means of a constantly driven drive means can drive the roll of film in a forward or reverse direction.

Suitably the film from each roll is passed through windows adjacent to which is provided means for detecting the location of individual frames. The means for detecting individual frames may comprise a magnetic or optical detector which is arranged to detect a magnetic or optical coding marker recorded on the film on or adjacent to each individual frame.

The drive arrangement for the roll films may consist of two shafts arranged to be driven by a single motor in different directions, each shaft having electrically operated clutches which enables engagement of the drive from the motor with a film holding means such a reel on which a said roll of film is mounted.

Such an arrangement provides not only an apparatus which can be readily programmed but also enables searching for an image on one roll while transfer of an image is being conducted on a further roll. The arrangement has further advantages if used as a master information store rather than a simple editor as such. The advantage of using a master unit is that original documents are recorded on reel films which become the master films for recording subsequent master microfiche or subsequent microfiches on which the information is updated. This enables images of the best quality to be retained on the master roll which are protected from damage by handling, while the updated or primary copies are provided with a good second generation image. Thus the quality of copies can be maintained at a second generation level throughout without deterioration by making third or fourth or subsequent generation copies.

The invention will now be described with reference to the accompanying drawings, in which:-

Figure 1:
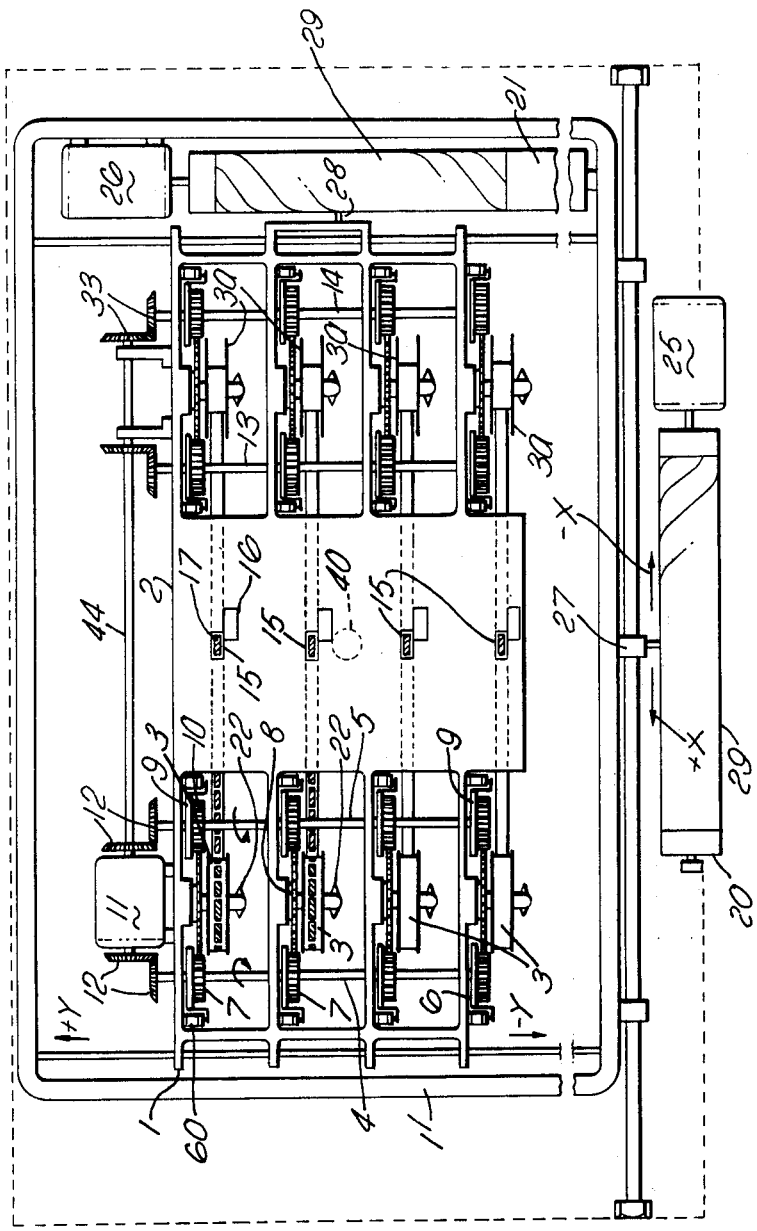
FIG. 1 is a partly diagrammatic plan of a microfilm carriage for a microform copying apparatus according to the invention.

FIG. 1 shows a carriage 1 of a microfilm to microfiche editing device which is particularly arranged to act in or with a microfilm store for transferring microfilm images to microfiches. The carriage 1 is mounted for Y movement on an outer carriage 1' which is itself mounted for X movement. Mounted on either side of the main plate 2 of the carriage 1 are four sets of reels 3 and 3a, reels 3 being store reels and reels 3a being receiving reels. The reels 3 are driven either in a forward direction by a shaft 4 or a reverse direction by a shaft 5 via electrically operated clutches 6 which transmit the drive from shaft 4 via gears 7 to geared rings 8 engaging with the reels 3. Reverse movement of reels 3 is achieved by engagement of clutches 9 on shaft 5 which clutches 9 transmit the movement from shaft 5 via gears 10 onto the gearing 8 engaging with the reels 3. Shafts 4 and 5 are constantly rotated by a motor 11 through suitable gearing 12. At the same time the receiving reels 3a may be similarly rotated in a reverse or forward direction by shafts 13 and 14 which are coupled to the motor 11 via gearing 33 on the connecting shaft 44.

Figure 2:
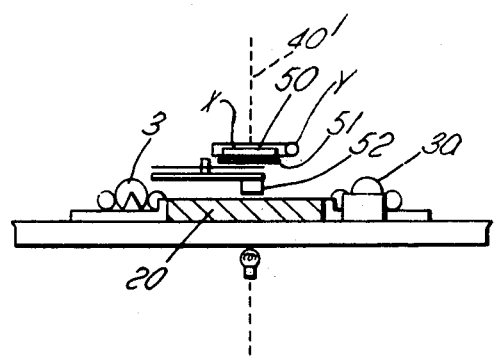
FIG. 2 is a diagrammatic elevation of a microform apparatus according to the invention including the carriage of Fig. 1.

On the carriage plate 2 there are windows 15 corresponding to each pairs of reels 3 and 3a. Adjacent to each window 15 there is provided a detector 16 which is arranged to read suitable coding on each image 17 on the rolls of films mounted on the reels. The detectors enable detection and selection of a particular image on each roll, so that when a pre-selected image is chosen by a suitable selection device (not shown), the drive to a particular reel of film can be disconnected by disengagement of one of the clutches 6 or 9 and the film held at a pre-selected window 15. While selection of the image is being carried out the carriage 1 is moved into a photographing position with the pre-selected window 15 under a lens in the microfiche camera by means of X and Y axis activators 20 and 21, driven by motors 25 and 26. When the activators are rotated cam followers 27 and 28 attached to the carriages are driven in an X or Y direction by engagement with helical grooves 29 in the activators. The helical grooves have discreet stops as may be seen in U.K. patent specification No. 1,278,041 or my co-pending patent application Ser. No. 586,656 now U.S. Pat. No. 4,015,901. At the same time as shown in Fig. 2, a means 50 for holding a microfiche film 51 is positioned in a requisite position relative to the camera lens 52, the axis 40' of which is represented by the cross and circle 40 in FIG. 1, so that a selected image can be transferred from the roll of film on to a microfiche held on the means 50 for holding a microfiche. This means 50 is enabled to be moved in an X and Y direction in a similar fashion to carriage 1 as shown in U.K. patent specification No. 1,278,041. The camera lens 52 is conveniently mounted on a turret as shown in U.S. Pat. No. 3,826,571.

Each reel 3 and 3a can be moved from the carriage 1 either manually as shown in FIG. 1 or preferably by an automatic means. In FIG. 1 the manual removal arrangement consists in a conventional film reel spring clip arrangement 22.

Figure 3:
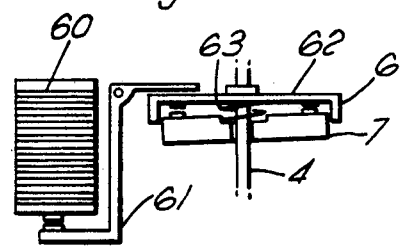
FIG. 3 shows a clutch for the carriage of Fig. 1.

In FIG. 3 a simple form of clutch 6 is shown though other magnetic clutches can be used. In the arrangement shown in FIG. 3 a solenoid 60 when activated attracts an arm 61 which brings a clutch member 62 into engagement with gear 7. This engagement of the clutch is achieved by the action of a spring 63 between the member 62 and gear 7. The member is slidably connected to shaft 4 so that on engagement of the member with the gear the gear is connected with shaft 4.

Figure 4:
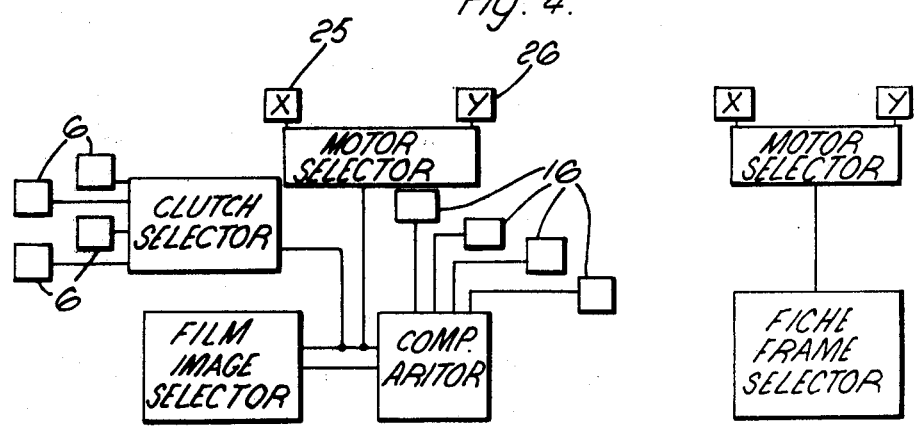
FIG. 4 is a block diagram of a selection arrangement for the apparatus of FIG. 2.

In FIG. 4 there is diagrammatically shown the selection arrangements for selecting a film frame and aligning it with a microfiche frame. As required a series of film images can be selected to be recorded sequentially on a microfiche.

In a projected microfiche store arrangement the reels of film are retained in the store at all times and provide a master reference system which is left untouched. In this way the master record is preserved and cannot be tampered with or destroyed in any way. At the same time access to the store of information can be made at any time by the selection and recording of information on microfiche laminae or further reels of microfilm or microfiche. These first generation copies can be made available for retrieval and publishing information or for updating purposes. The advantage of having untouched safe information store is obvious when considered with respect to electronic computer stores which can be tampered with or destroyed with, in some cases, no record of how the tampering or destruction has been carried out. It is further clear that the security offered by such a system makes it suitable for storing information of a nature such as legal or confidential records.

I claim:

1. A microform copying apparatus comprising a housing, a camera lens, a first carriage moveable in an X and Y direction in relation to the camera lens, means for holding a plurality of rolls of microfilm on said carriage, means for moving said microfilm past windows defined by apertures in said carriage, microfiche holding means moveable in an X and Y direction in relation to the camera lens, illumination means associated with said carriage for projecting an image from a selected said roll of film onto a microfiche held on said microfiche holding means, whereby images from the microfilm transfer to the microfiche.

2. Apparatus as claimed in claim 1 wherein each roll of microfilm is detachably mounted on a drive arrangement which by means of a constantly driven drive means can drive the roll of microfilm in a forward or reverse direction.

3. Apparatus as claimed in claim 2 wherein the drive arrangement further comprises two shafts each driven by a single motor in different directions, each shaft having electrically operated clutches adapted to transmit the drive from the motor in one direction or the other to reels on which the rolls of film are mounted, and a further two shafts driven by the motor similarly arranged to transmit the drive from the motor to take up reels for each roll of film.

4. Apparatus according to claim 1 wherein each said window is provided with means for detecting the location of individual frames on the microfilm.

5. Apparatus as claimed in claim 4 wherein the means for detecting the location of the individual frames comprises a magnetic or optical detector which is arranged to detect a magnetic or optical coding marker recorded on the microfilm on or adjacent to each individual frame.

* * * * *